United States Patent
Price

(10) Patent No.: US 9,176,960 B2
(45) Date of Patent: Nov. 3, 2015

(54) PLAYLIST OF MULTIPLE OBJECTS ACROSS MULTIPLE PROVIDERS

(75) Inventor: Pat William Price, Keller, TX (US)

(73) Assignee: Vizio, Inc, Irvine, CA (US)

( * ) Notice: Subject to any disclaimer, the term of this patent is extended or adjusted under 35 U.S.C. 154(b) by 434 days.

(21) Appl. No.: 12/824,316

(22) Filed: Jun. 28, 2010

(65) Prior Publication Data

US 2011/0320020 A1 Dec. 29, 2011

(51) Int. Cl.
*G06F 17/00* (2006.01)
*G06F 17/30* (2006.01)
*G06Q 30/06* (2012.01)

(52) U.S. Cl.
CPC .... *G06F 17/30053* (2013.01); *G06F 17/30017* (2013.01); *G06Q 30/06* (2013.01)

(58) Field of Classification Search
CPC .......... G06F 17/3074; G06F 17/30864; G06F 17/30749; G06F 17/30654; H04N 21/26258; H04N 21/482; H04N 21/4825
USPC ........................................ 369/30.08; 707/770
See application file for complete search history.

(56) References Cited

U.S. PATENT DOCUMENTS

| | | | |
|---|---|---|---|
| 7,814,135 B1 * | 10/2010 | Hempleman et al. | 707/621 |
| 8,219,536 B2 * | 7/2012 | Wohlert | 707/694 |
| 2004/0057348 A1 * | 3/2004 | Shteyn et al. | 369/30.38 |
| 2004/0220926 A1 * | 11/2004 | Lamkin et al. | 707/3 |
| 2006/0059535 A1 * | 3/2006 | D'Avello | 725/139 |
| 2007/0083556 A1 * | 4/2007 | Plastina et al. | 707/104.1 |
| 2008/0133376 A1 * | 6/2008 | Hill | 705/26 |
| 2008/0155613 A1 * | 6/2008 | Benya et al. | 725/89 |
| 2008/0235588 A1 * | 9/2008 | Gonze et al. | 715/719 |
| 2009/0249412 A1 * | 10/2009 | Bhogal et al. | 725/104 |
| 2011/0225156 A1 * | 9/2011 | Pavlik | 707/737 |

* cited by examiner

*Primary Examiner* — Fan Tsang
*Assistant Examiner* — David Siegel

(57) ABSTRACT

A system includes a device such as a television or multimedia player that has access to content residing at various storage sites and multimedia content providers. For example, the device has access to locally stored content, remotely stored content, music content that resides at music service providers such as Rhapsody and video content from multiple providers such as YouTube, NetFlix, Amazon, VuDu, etc. The user is provided with tools to create a playlist of content where the content includes, for example, one or more videos from local storage and remote services such as YouTube, NetFlix, Amazon, VuDu, etc.

18 Claims, 6 Drawing Sheets

PLAYLIST OF MULTIPLE OBJECTS ACROSS MULTIPLE PROVIDERS

FIELD

This invention relates to the field of content reproduction devices and more particularly to a system for providing a combined playlist for a device such as a television.

BACKGROUND

With increases in quantities of content of which one owns or has access, the task of managing individual works becomes increasingly difficult. Up until a few years ago, only a few individuals had or had access to sufficient content to require tools to manage the content.

Soon after Edison invented recorded music using the gramophone to record sound on a cylinder, the rare few that owned a player had at most a few recordings or content. The development of the disk record in the early 1900s enabled mass production of music content, leading to individuals having dozens of music disks. In the early days, the disks were one-sided or two-sided spinning at 78 revolutions per minute and having one song on each side. It wasn't until the 40s that long-play disks began, revolving at 45 RPM or 33 RPM and delivering either two songs (one per side) from a small-format 45 RPM standard (singles) or a collection of around a dozen songs on a larger format (album) revolving at 33⅓ RPM. During this period, it was not uncommon for a person or family to own many dozen singles or albums. Management of this amount of content was easily performed by storing the content in boxes or on shelves.

In the mid-20$^{th}$ century, the video age began with the introduction of television. Movies, news, advertisements, cartoons, etc. were recorded on analog video tape and distributed to viewers over the air using a broadcast system. An early effort was made by RCA to provide content such as movies to individual homes using a video disk technology called videodisc, laserdisc or Capacitance Electronic Disc (CED) in 1964, but never became very popular due to size of the media and costs. Still, owners of such systems often had less than 100 movies at a cost of around $100 per movie. By the time RCA finally swung into production of CED players and content, it was too late because of the introduction of Betamax and VHS videocassette formats. These new cassette video tape systems had advantages over CED that included lower cost, smaller size and they enabled recording of content from the broadcast channels. Soon, people found themselves with hundreds of video cassettes, some with pre-recorded content and some that they recorded from television broadcasts. To organize these cassettes, furniture was developed that enabled the owners to store and view the titles of 50-100 video cassettes at a time.

During this same time period, alternate formats were developed for music as well, providing the audiophile with abilities to record music at home and, later, listen to recordings in their automobile or while out of the home. Home reel-to-reel tape players/recorders were available in the early 1950s, allowing mostly musicians to record their works at home. Smaller, lower cost systems came on the market and there was a small, ill-fated attempt to provide pre-recorded content on reel-to-reel format. Problems with exposed tape such as breakage and the required splicing, head cleaning, rewind time, etc, led to the eventual demise of this format.

To address the portability needs of, for example, automobiles, a new ¼" tape format was developed using a continuous loop of tape in which the tape was pulled from the hub of the reel and replaced on the outer layer of the reel. This format, called 8-track tapes, was popular in the late 1960s, mostly for automotive use with a few players being integrated into home audio systems. The audio quality of this format was initially good, but the tapes often jammed or eventually wore due to being pulled from the hub during playback. Still, many owners built collections of many dozens of "albums" on 8-track tapes, keeping them in boxes or furniture in which the titles were easily viewed.

Soon, a new format to tape called cassettes supplanted the 8-track market. The cassette tapes were smaller, having ⅛" tape instead of ¼" for 8-track cassettes, but had 4 tracks of audio instead of 8 tracks, two tracks for playing in one direction, and then the cassette was reversed to play the other two tracks. Again, many owners built collections of many dozens of "albums" on cassette tapes, keeping them in boxes or furniture in which the titles were easily viewed.

In the early 1980s, a new format and technology emerged that would soon push aside vinyl records and all forms of tape. In 1983, the Compact Disc was made available to consumers. Unlike the prior media, the compact disc was digital (the analog music was encoded into digital values) and the CD had many advantages including sound quality, small size, easy handling, viable for portable and automotive use, resistance to heat (e.g. automotive) and lower in cost. The CD soon became the primary standard for music and vinyl records sales soon tanked. Now, because of low costs, smaller format and multiple uses (home and automobile), people found themselves with hundreds of CDs. Still, organization was by furniture or CD jackets.

In a similar way, the video cassette soon gave way to Digital Versatile Disc (DVD) and later, Blu-ray using the same size format as CD audio, providing high-definition video. People soon found themselves with hundreds of video discs, organizing in the same way as CDs were organized in jackets and furniture.

Soon after the introduction of the personal computer, many companies added sound reproduction to such systems. Initially, the sound reproduction was used as a notice or to create sound effects with video games, but it didn't take long for computer experts to find ways to store digitized music on hard drives of a computer. Likewise, as DVDs became prevalent, using some of the same compression techniques to store a full-length movie on a DVD disc, people found ways to store video on computer hard drives as well. In the early days, computer systems had 5-20 megabytes of hard disk storage storing only a few songs and/or movies, but as capacity grew and compression increased, these numbers grew quickly. By the early 2000s, it became common for a single user to have over 1000 individual songs or dozens of movies stored on a hard drive of their computer. By 2009, the typical computer system had around 500 gigabytes of storage (GB) capable of storing around 100 movies or 150,000 songs.

The digital content era brought about new content distribution models and new forms of content players. People started moving content from their CDs to hard drives of their computers. Content players were developed to reproduce digital content on-the-go (e.g. portable music players like IPOD). Digital content became available to home systems, automotive systems, televisions, etc. Music and video was made available over computer networks (e.g. the Internet) and people started getting content, one song or one video at a time, downloaded to their computers or devices through the Internet.

Additionally, services such as Napster and Netflix evolved to contain huge libraries of content and, after paying a monthly subscription fee, a subscriber has access to all content in these libraries until they unsubscribe.

Now, a typical media player has sufficient storage to hold thousands of songs and some home systems have storage sufficient to store many hundreds of movies. Access to services such as Napster and Netflix further increased the number of titles available to each user. This leads to organizational and management complexity. One can no longer look at titles on the edge of a CD jewel case or the side of a VHS cassette to find a song or movie that they the wish to listen or view. Being bits stored on a disk, the user no longer handles the content and no longer sees the media. There is no packaging and no printed labels. Now, the user must access the content through digital libraries and lists.

Organization tool were provided by software, an example of this is Mircrosoft's Media Player, providing lists of, for example, all songs stored on the user's computer and the ability to search for a song by title, writer, performer, etc. Many media players also provide organization tools, often with very limited user interface devices such as a small display and limited keyboard.

Often, users need a way to organize their content for various reasons. For one, at times, the user is in the mood for a certain type of music or music by a certain artist. For another, the user finds that it is easier to find content that is organized in a certain fashion such as by their own category, etc. Users have found that playlists are an important way to organize content. Many of these organization tools include the ability of creating playlists. In general, a playlist is a list of pointers to the individual content and is used to play a subset of the content available, to copy a subset of content to, for example, another device, to help locate a particular content, etc.

In the past, the playlist contained a list of pointers to songs which may all be in a folder or subdirectory on a storage device or contained on different local storage devices. Some newer devices have software supporting the DLNA (Digital Living Network Alliance), allowing a first device to access multimedia content residing on multiple storage devices. When content is spread across different systems and services, the existing playlists are not capable of finding and tracking the desired content.

What is needed is a playlist that combines content that resides at various storage sites and multimedia content providers.

SUMMARY

A device such as a television or multimedia player has access to content residing at various storage sites and multimedia content providers. For example, the device has access to locally stored content, remotely stored content, music content that resides at music service providers such as Rhapsody and video content from multiple providers such as YouTube, NetFlix, Amazon, VuDu, etc. The user is provided with tools to create a playlist of content where the content includes, for example, one or more videos from local storage, YouTube, NetFlix, Amazon, VuDu, etc.

In one embodiment, a system for organizing content in a playlist is disclosed including an interface to a network and content available from one or more access locations. At least one of the access locations is remotely connected to the system. There is a way to identify each of the content and a way to associate an access location with each of the content.

In another embodiment, a method of organizing content available to a device is disclosed. The device has a display and the method includes (a) capturing identification of content and storing the identification information in a playlist. A (b) current content is set to a first content of the content and (c) local storage is searched for the current content. (d) If the current content is found, the location of the current content is associated with the identification of the current content in the playlist. (e) If the current content is not found, storage and devices connected locally to the device is searched for the current content and if the current content is found, the location of the current content is associated with the identification of the current content in the playlist. (f) If the current content is again not found, services connected to the device through a wide-area network are searched for the current content and if the current content is found, the service is associated with the identification of the current content in the playlist. (g) If the current content is still not found, the playlist is marked as such. (h) If there is a next content in the plurality of content, the current content is set to a next content of the plurality of content and repeat steps c-h.

In another embodiment, a device is disclosed including a processor with a display operably interfaced to the processor and an interface to a network. Software running on the processor accepts a plurality of content identifiers and finds content related to each of the content identifiers. At least one of the content is found on a remote device that is accessible to the device through the network.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
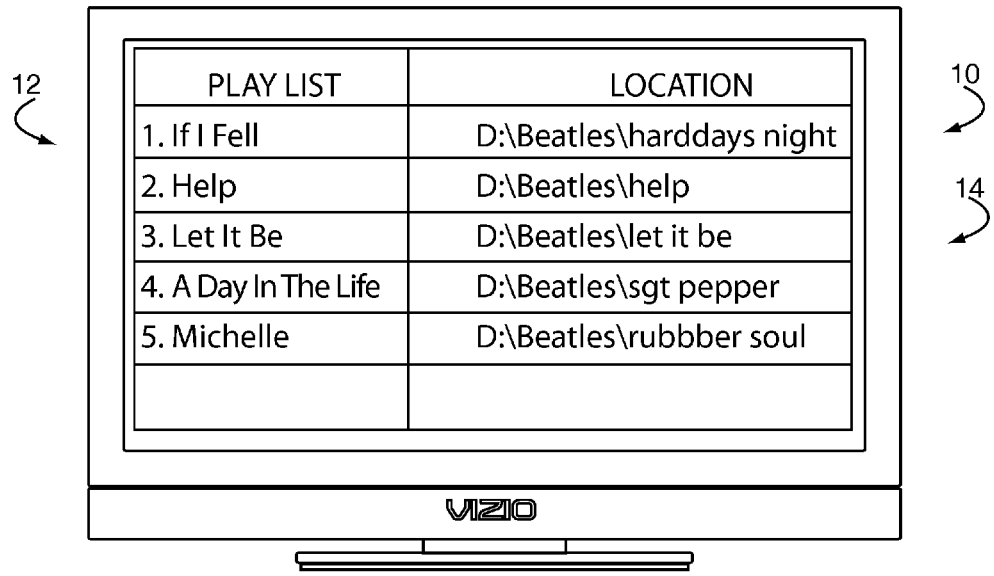
FIG. 1 illustrates a view of an exemplary playlist of the prior art.

Reference will now be made in detail to the presently preferred embodiments, examples of which are illustrated in the accompanying drawings. Throughout the following detailed description, the same reference numerals refer to the same elements in all figures. Although the following explanation use a typical television as an example, many other devices that have access to content are included here within including, but not limited to, media players (e.g. MP3 players, video players, etc), computer systems, media console systems, Blu-ray disk players, etc.

Referring to FIG. 1, a view of a playlist 10 of the prior art will be described. In the playlist of the prior art, several songs 12 appear in the playlist along with links 14 to the location where the songs 12 are stored. For example, the first entry is the song, "If I Fell" and it is stored locally on a drive referred to as, "D:" in a subdirectory "harddays night" of a directory "Beatles" as shown in the links 14. In this example, all of the content is stored locally on a local drive referred to as, "D:" in various subdirectories.

In general, the user or a software application creates a hierarchy of subdirectories (also known as folders) containing other subdirectories and/or songs. There is no requirement to have subdirectories as playlists function equal as well if all of the content is stored in one directory or the drive root without using subdirectories.

Figure 2:
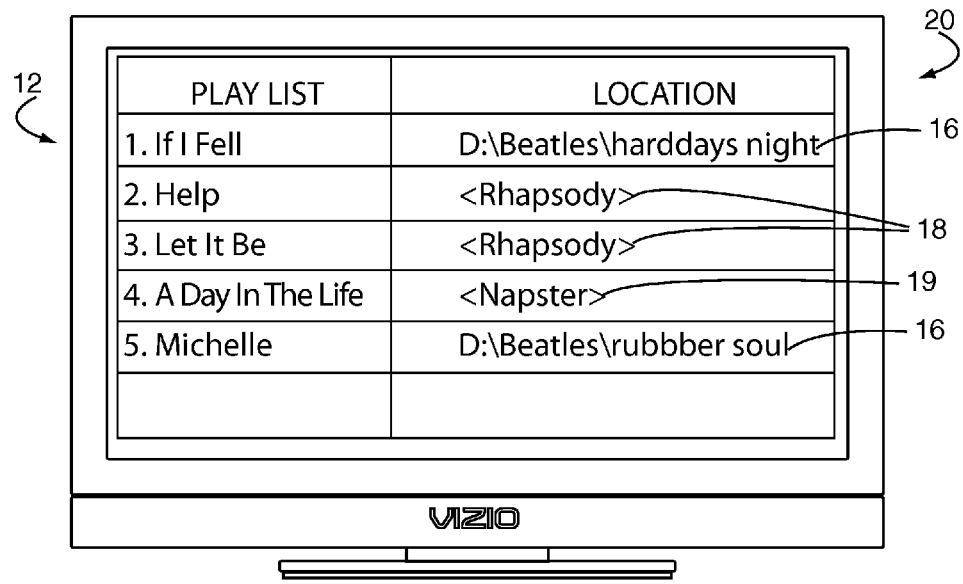
FIG. 2 illustrates a view of an exemplary playlist.
Figure 3:
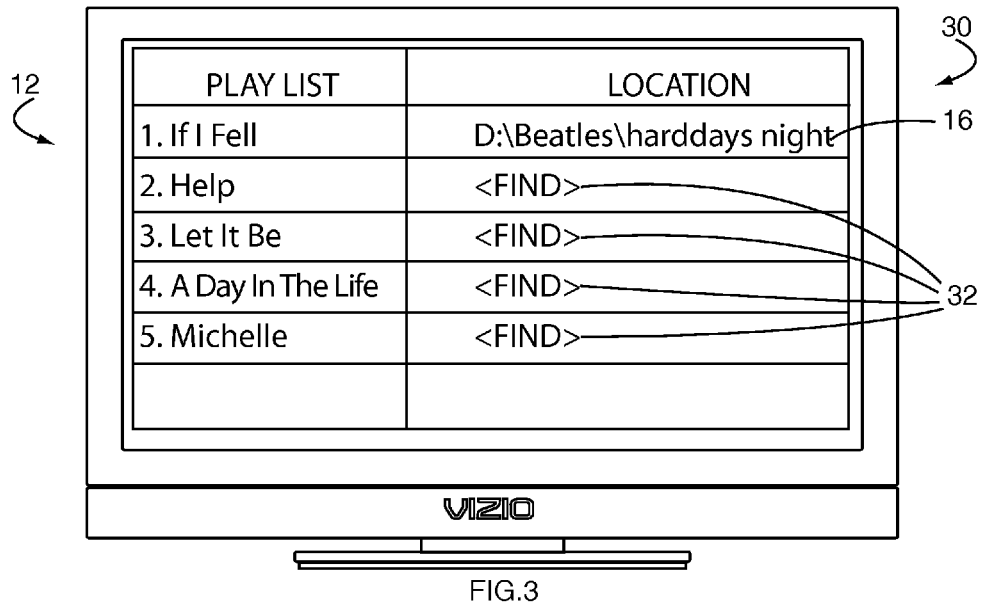
FIG. 3 illustrates a view of a second exemplary playlist.

Referring to FIGS. 2-3, views showing exemplary playlists 20/30 are shown. There are many ways to portray a playlist on a device having a display (for example, a television 5 as in FIG. 6 or media player 50 as in FIG. 7), and the playlists 20/30 described here within are use one example, wherein many other arrangements, formatting, highlighting, addressing mechanisms are anticipated, all of which are included here within.

In the exemplary user interface shown in FIG. 2, portrays a typical playlist 10. Several songs 12 appear in the playlist 10 along with links to the location where the songs 12 are stored. The list of songs 12 is the same as shown as in FIG. 1, but the location where the songs are retrieved for reproduction is different. For example, the first entry is the song, "If I Fell" and it is stored locally on a drive referred to as, "D:" in a subdirectory "harddays night" of a subdirectory "Beatles" as in FIG. 1. Likewise, the fifth song, "Michelle" is stored locally on a drive referred to as, "D:" in a subdirectory "rubber soul" of a subdirectory "Beatles". In this example, two songs 12, "Help" and "Let it Be", are located at (accessed from) a music service, Rhapsody 18; and one song 12, "A Day in the Life", is located at a music service, Napster 19. In this example, when the user accesses the playlist, for example to listen to the songs 12, the first and fifth song 12 is accessed from local storage, the second and third song 12 from Rhapsody 18 and the fourth song 12 from Napster 19.

Figure 5:
FIG. 5 illustrates a view of a third exemplary playlist.
Figure 6:
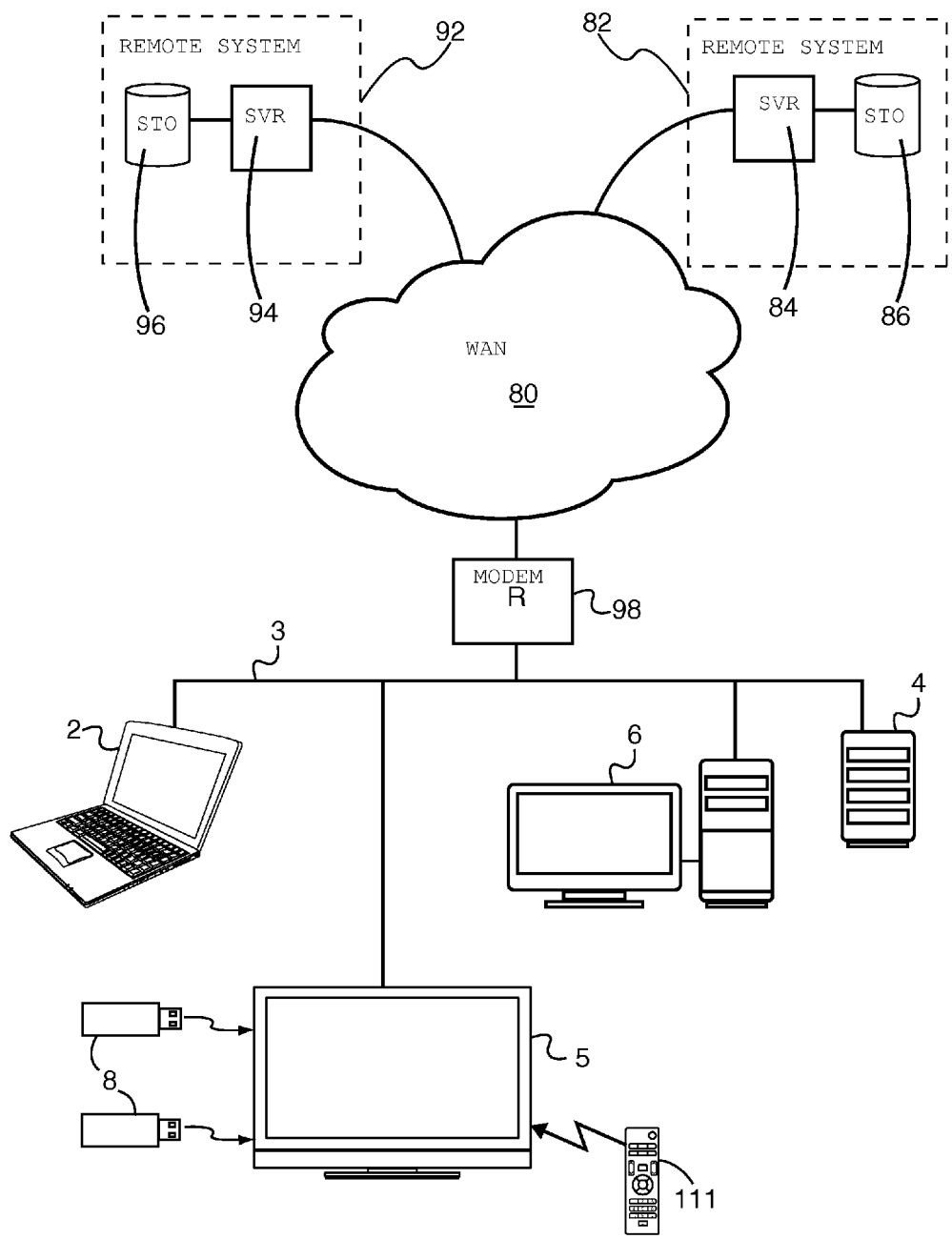
FIG. 6 illustrates a block diagram of a typical television system interfaced through a network to various content sources.
Figure 7:
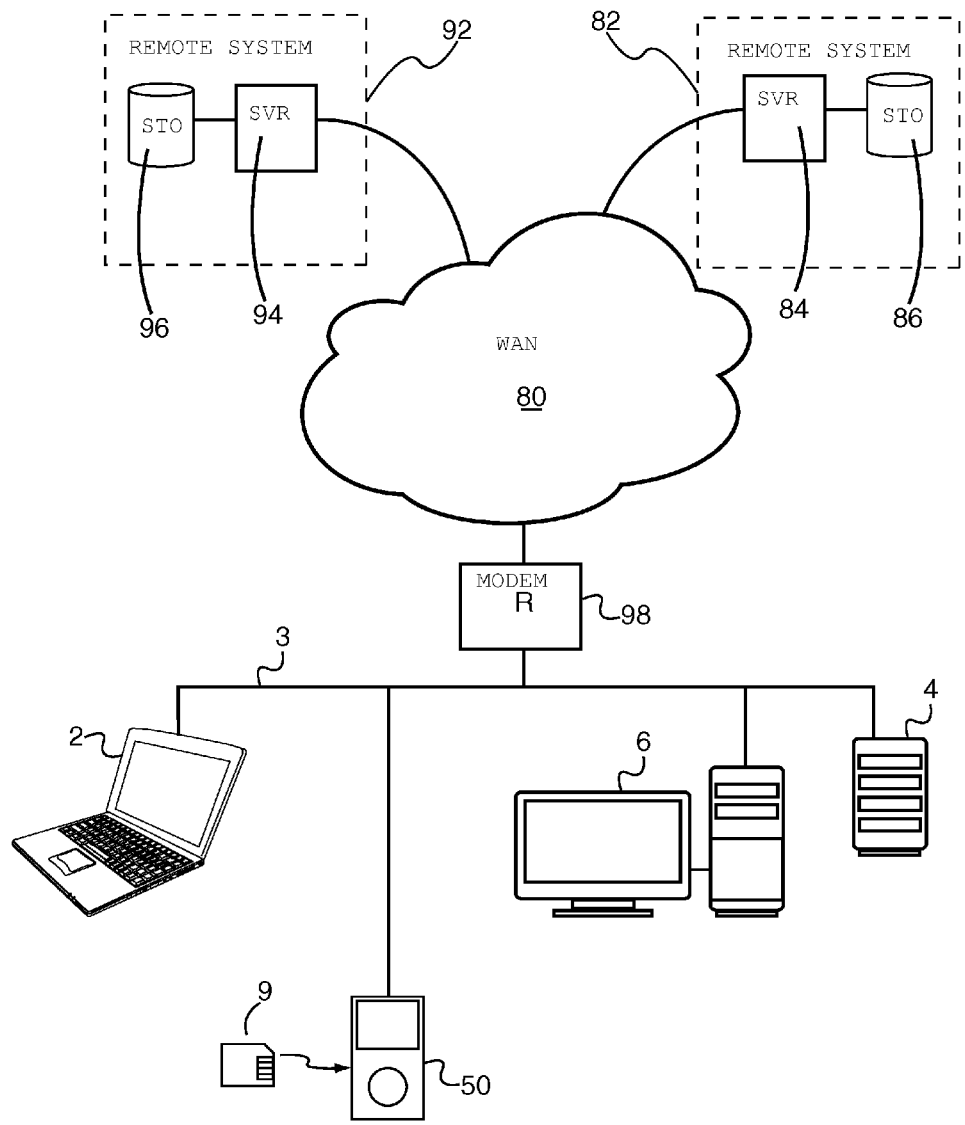
FIG. 7 illustrates a block diagram of a typical media player system interfaced through a network to various content sources.

In the exemplary user interface shown in FIG. 5, there is a typical playlist 30 as in FIG. 3, but the locations of the content is now filled in. Several songs 12 appear in the playlist along with links to the location where the songs 12 are stored. The same list of songs 12 is shown as in FIG. 1, but the location where the songs are retrieved for reproduction is different. In this example, the first entry is the song, "If I Fell" was found locally on a drive referred to as, "D:" in a subdirectory "harddays night" of a subdirectory "Beatles" as in FIG. 1. The second song 12, "Help" was located at a music service, Napster 34 and the third song 12, "Let it Be", was located at a music service, Rhapsody 36. The fourth song 12, "A Day in the Life", was located on a local drive, "D:" in the subdirectory "sgt pepper" of the directory "Beatles" 16. The fifth song, "Michelle" was located remotely on a drive referred to as, "X:" in a subdirectory "rubber soul" of a subdirectory "Beatles", shown as 38. In this example, when the user accesses the playlist, for example to listen to the songs 12, the first and fourth song 12 is accessed from local storage, the second song 12 is accessed from Napster 34, the third song 12 from Rhapsody 36 and the fifth song 12 from a connected storage device such as a jump drive 8, network attached storage 4 or computer system 2/6 as shown in FIGS. 6 and 7.

Figure 4:
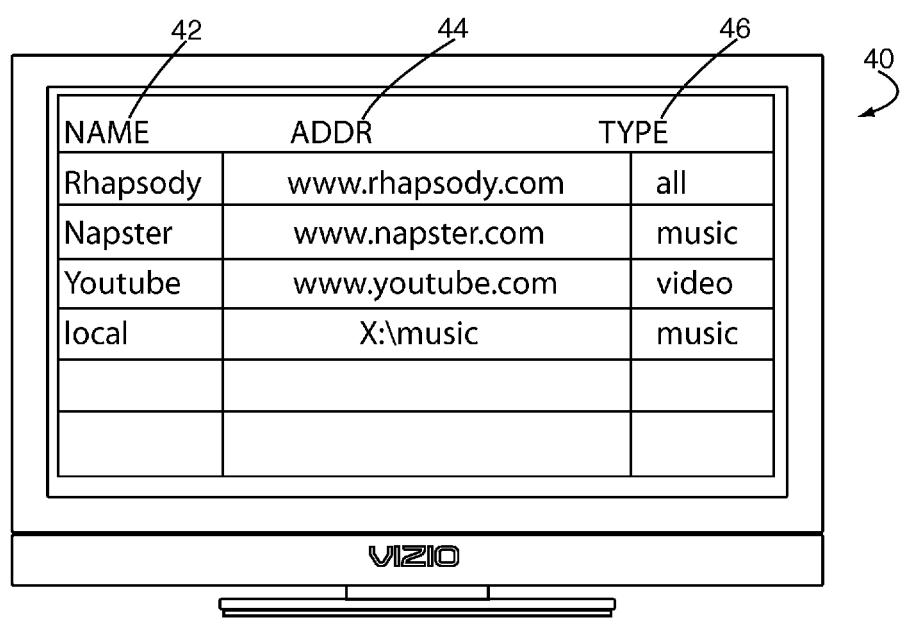
FIG. 4 illustrates a view of a content search interface.

Referring to FIG. 4, a content search list 40 is described. The content search list 40 contains a list of locations in which various contents are to be located. In this example, the list 40 has list names 42 such as Rhapsody, Napster, etc, in a first column. The next column 44 has addresses for the services or storage and the last column has an indication of what type of content 46 is located at the address 44. For example, Rhapsody has all types of content while Napster and the local storage X: has music and Youtube has video. This simplified table 40 is populated through a user interface as known in the industry and it is anticipated that other features and/or columns are present such as scrolling, add/delete, test, etc. In some embodiments, the list is accessed sequentially. For example, when the playlist system searches to find the second song 12, "Help" (see FIG. 3), the system first checks Rhapsody (type=all), then Napster (type=music) and then X:\music (type=music). Youtube is skipped because the type is "video" and "Help" is a song. Other orders of searching are anticipated to minimize costs to the user. For example, local storage is searched first (e.g. D:), then content located on a local area network (e.g. X:) then the service providers (e.g. Napster). It is also anticipated that, in some embodiments, costs are associated with each entry. For example, local content is assumed to be already purchased and, therefore, the cost is zero while content from Napster may be more expensive than content from Rhapsody, so the cost for Rhapsody is 1, and the cost for Napster is 2. Therefore, the local content is searched first, then the next more expensive (Rhapsody), then the next (Napster), etc. In some embodiments, the actual cost of the content is used to determine where the content is obtained. Some services provide content on a unit cost basis such as $1.00 to download a song or $14.00 to download a particular movie. Since some songs/movies cost more or less, each site is checked to determine if the desired content is available and, if so, the price is determined, then after all sites are checked, it is determined which site has the lowest price and the content is obtained from that site.

It is anticipated that, in the preferred embodiment, logon credentials and/or credit card information is captured and stored for each site, enabling automatic purchase of needed content. In other embodiments, each time a purchase needs to be made, a purchase interface is presented informing the user of the cost to buy the individual content and requesting confirmation and, in some embodiments, purchasing credentials and/or credit card information.

In the exemplary user interface shown in FIG. 5, there is a typical playlist 30 as in FIG. 3, but the locations of the content is now filled in. Several songs 12 appear in the playlist along with links to the location where the songs 12 are stored. The same list of songs 12 is shown as in FIG. 1, but the location where the songs are retrieved for reproduction is different. In this example, the first entry is the song, "If I Fell" was found locally on a drive referred to as, "D:" in a subdirectory "harddays night" of a subdirectory "Beatles" as in FIG. 1. The second song 12, "Help" was located at a music service, Napster 34 and the third song 12, "Let it Be", was located at a music service, Rhapsody 36. The fourth song 12, "A Day in the Life", was located on a local drive, "D:" in the subdirectory "sgt pepper" of the directory "Beatles" 16. The fifth song, "Michelle" was located remotely on a drive referred to as, "X:" in a subdirectory "rubber soul" of a subdirectory "Beatles". In this example, when the user accesses the playlist, for example to listen to the songs 12, the first and fourth song 12 is accessed from local storage, the second song 12 is accessed from Napster 34, the third song 12 from Rhapsody 36 and the fifth song 12 from a connected storage device such as a jump drive 8, network attached storage 4 or computer system 2/6 as shown in FIGS. 6 and 7.

Referring to FIG. 6, a block diagram of a typical television 5 system interfaced to various devices 2/4/6/8 and/or services 82/92 is described. The television 5 is shown with a wireless remote control 111 (e.g. infrared or radio frequency) and, in this example, is connected to a network 3, for example an Ethernet local area network 3, through any known network interface. This is an example of one network and the type of network is not limited and includes, for example, Ethernet (e.g. 802.3), WiFi (e.g 802.11), wireless adapters/routers, routers, bridges, phone lines networks, cable networks, fiber optic networks, etc. In some examples, computers 2/6 are connected to the network 3 through similar networking infrastructures. In this example, a network attached storage device 4 is also interfaced to the network 3.

As shown, one or more servers 84/94 are also operatively connected to the television 5 through the network 3, a modem 98 and wide area network 80 (e.g. Internet) as known in the industry. There are many known and unknown configurations and topologies for operatively connecting a television 5 to devices 2/4/5/6/8 and remote systems 82/92, all of such are anticipated and included here within.

The devices 2/4/5/6/84/94 on the network 3 and wide-area network 80 (e.g. Internet) have addresses (e.g. MAC addresses URLs, etc) for establishing connections.

Some devices are directly connected to the television 5 as depicted by two USB jump drives 8 connected directly to USB ports of the television 5. Any known device is anticipated to be directly connected to the television 5 through any known connection (e.g. USB, Firewire), including, but not limited to, backup storage devices, USB jump drives 8, DVD drives, Bluetooth Drives, etc.

The provider servers 84/94, for example, provide services as described above such as Netflix, Pandora, and Amazon. This is a simplified view of systems 82/92 that include one or more servers 84/94 and storage 86/96 for storing, for example content.

In these examples, content is available locally (internal storage of the television 5), available on directly connected devices (e.g. attached storage 8), on a local area network 3 (e.g. on network attached storage 4 and computers 2/6) and/or remotely on drives 86/96 connected to servers 84/94. All such content is available for inclusion and linking to a playlist.

Referring to FIG. 7, a block diagram of a typical media player system 50 interfaced to various devices 2/4/6/8 and/or services 82/92 is described. In this example, the media player system 50 is connected to a network 3, for example an Ethernet local area network 3, through any known network interface. This is an example of one network and the type of network is not limited and includes, for example, Ethernet (e.g. 802.3), WiFi (e.g. 802.11), wireless adapters/routers, routers, bridges, phone lines networks, cable networks, fiber optic networks, etc. In some examples, computers 2/6 are connected to the network 3 through similar networking infrastructures. In this example, a network attached storage device 4 is also interfaced to the network 3.

As shown, one or more servers 84/94 are also operatively connected to the media player system 50 through the network 3, a modem 98 and wide area network 80 (e.g. Internet) as known in the industry. There are many known and unknown configurations and topologies for operatively connecting a media player system 50 to devices 2/4/5/6/9 and remote systems 82/92, all of such are anticipated and included here within.

The devices 2/4/5/6/84/94 on the network 3 and wide-area network 80 (e.g. Internet) have addresses (e.g. MAC addresses URLs, etc) for establishing connections.

Some devices are directly connected to the media player system 50 as depicted by a memory card 9 connected directly to a port of the media player system 50. Any known device is anticipated to be directly connected to the media player system 50 through any known connection (e.g. USB, Firewire), including, but not limited to, backup storage devices, USB jump drives 8, memory cards 9, DVD drives, Bluetooth Drives, etc.

The provider servers 84/94, for example, provide services as described above such as Netflix, Pandora, and Amazon. This is a simplified view of systems 82/92 that include one or more servers 84/94 and storage 86/96 for storing, for example content.

In these examples, content is available locally (internal storage of the media player system 50), available on directly connected devices (e.g. attached storage 9), on a local area network 3 (e.g. on network attached storage 4 and computers 2/6) and/or remotely on drives 86/96 connected to servers 84/94. All such content is available for inclusion and linking to a playlist.

Figure 8:
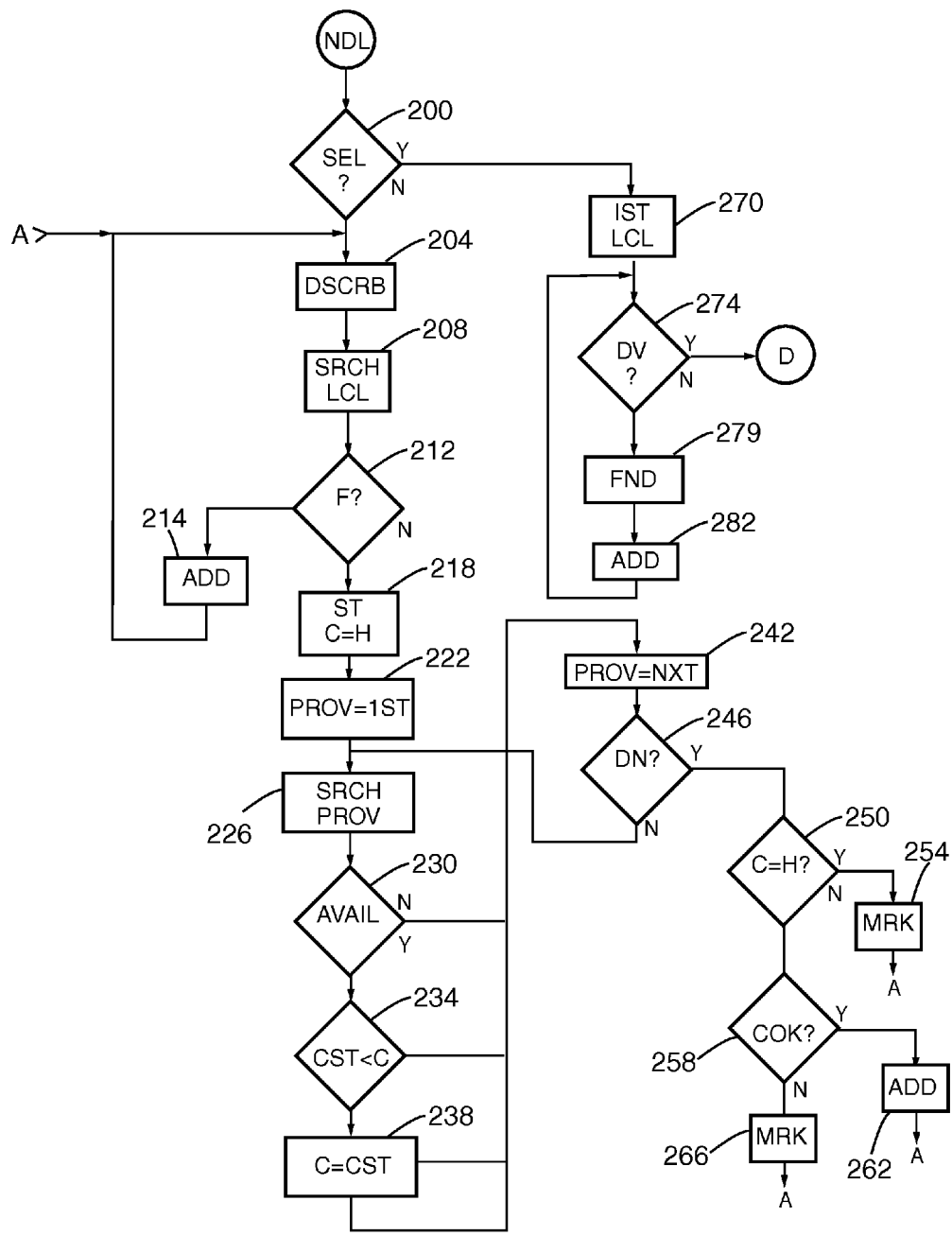
FIG. 8 illustrates a flow chart of a typical television system.

Referring to FIG. 8, a flow chart of a typical device system will be described. This exemplary flow depicts a typical program operating on a processor within the device such as the television 5 or media player system 50. In this, a selection is made 200 to determine if the playlist is a local playlist or a mixed playlist. If the selection 200 is local, local content is listed/searched 270 and until done 274, the content requested is found 279 and added to the list 282.

If the selection 200 is mixed, then a description of the content is obtained 204 such as a song title, movie title, etc. Next, in the preferred embodiment, locally accessible storage is checked 208 since it makes sense to use content already owned by the user. The locally accessible storage includes, for example, storage local to the device 5/50, storage directly connected to the device 5/50 such as a jump drive 8, network attached storage 4 and storage attached to networked computers 2/6. If the content is found locally 212, it is added to the playlist 214 and the search continues.

If the content is not found locally 212, an initial cost is assigned 218 (e.g. High) to the lowest cost and the current provider is set 222 to the first provider in the list. The current provider is checked at 226 to see if the content is available 230. If the content is available 230, the cost is determined and compared 234 to the lowest cost and if the cost is lower 234 than the lowest cost, the provider is remembered and the cost is set to the cost from the provider 238. In either case, the current provider is set 242 to the next provider and if there are more providers 246, the previous steps repeated for the next provider. If there are no more providers 246 and the cost remains the initial high value 250, then that content on the list is marked at 254 as unavailable and the next entry on the list is checked. If there are no more providers 246 and the cost has been set 250, then if the cost is acceptable 258, a purchase is made and the content is added to the playlist 262. Otherwise, the entry in the playlist is marked 266 as being too expensive. In this example, the user has set a maximum price to pay for certain content such as $1.05 for a song, etc.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for organizing content in a playlist, the system comprising:

a computer, having an interface to a network and having a memory storing a playlist, said playlist including plural different entries, each entry representing an item of multimedia, and each item having a title of the multimedia, and each item having a location identifier storing information representing a location of the multimedia, where said location identifier stores a first location for a first multimedia representing a location on a local storage device which is physically attached to the computer, and stores a second location for a second multimedia representing a location on an Internet access location where said Internet access location connects via said network interface and which includes a name of a content provider among multiple different content providers, and said computer operating to accept an entry to a playlist from a user and store said entry with said location identifier indicating that a location of the content has not been yet found, and needs to be found in the future, said computer operating to find content, subsequent to storing said location identifier indicating that a location of the content has not been yet found by searching through a list of multiple different content providers by connecting over the Internet, determining a price for obtaining content from each of the multiple different content providers, comparing the price to a maximum cost that has been previously sent by a user, and also comparing the price to a lowest price that has been obtained from other content providers, and setting a new lowest price if the price is lower than the lowest price from other content providers, and selecting a lowest price content provider if the lowest price content provider has a cost less than the maximum cost, and changing the indication of the location of the content has not yet been found to a location of the content after rights have been obtained, said computer marking the content as unavailable if the content is not found on any of the multiple content providers; and said computer marking the content as too expensive if the content on all prices for obtaining the content are greater than the maximum cost.

2. The system of claim 1, wherein the location of content after the rights have been obtained is only a name of a content provider from which the rights have been obtained and not a complete internet address, where the playlist includes multiple different names representing said multiple different content providers.

3. The system of claim 1, wherein the system further stores a translation between names of multiple sources, and Internet addresses of said multiple sources.

4. A method of organizing content available to a device, the device having a display, the method comprising:

capturing identification of a plurality of content and storing identification information indicative of the identification in a playlist;

setting a current content to a first content of the plurality of content in order to play the current content;

if the current content includes an indication of a stored location, then playing the current content from the stored location;

if the current content does not include an indication of the stored location, then searching local storage for the current content and if the current content is found, associating the location of the current content on the local storage with the identification of the current content in the playlist by storing information in the playlist about a found location of the current content;

if the current content is not found in said local storage, searching multiple different services connected to the device through the Internet for the current content and if the current content is found, associating the service with the identification of the current content in the playlist by storing information indicating only a name of the service as part of the playlist, where the playlist includes multiple different names representing said multiple different services, wherein locations for different multimedia in the playlist include all of a location identifier representing a location on the local storage which is physically attached to the device, the name of the service as an Internet access location where said Internet access location connects via a network interface and which includes multiple different content providers, and stores multiple items of content, and also stores an indication, for at least one item, that a location of the content has not been yet found, and needs to be found in the future, operating to find content, subsequent to storing said location identifier indicating that a location of the content has not been yet found by searching through a list of multiple different content providers by connecting over the Internet, determining a price for obtaining content from each of the multiple different content providers, comparing the price to a maximum cost that has been previously sent by a user, and obtaining rights to the content only if the price is not higher than the maximum cost, and also comparing the price to a lowest price that has been obtained from other content providers, and setting a new lowest price if the price is lower than the lowest price from other content providers and selecting a lowest price content provider whose cost is not higher than the maximum cost, and changing the indication of the location of the content has not yet been found to a location of the content after rights have been obtained; and marking the content as unavailable if the content is not found on any of the multiple content providers; and marking the content as too expensive if the content on all prices for obtaining the content are greater than the maximum cost.

5. The method of claim 4, wherein the storage and devices connected locally to the device includes a computer system having a storage device containing the content.

6. The method of claim 4, wherein the storage and devices connected locally to the device includes a storage device interfaced to a port of the device.

7. The method of claim 4, further comprising the step of playing the plurality of content, including retrieving each of the plurality of content from an associated content location and reproducing the content.

8. The method of claim 4, wherein the step of reproducing the content includes converting from a digital audio format into an analog audio format.

9. A device comprising:

a processor;

a display operably interfaced to the processor;

an interface to a network;

software running on the processor that accepts a plurality of content identifiers and creates a playlist that includes plural different entries, each entry representing an item of multimedia, and each item having a title of the multimedia, and an entry for a first item of multimedia that indicates the first item of multimedia is stored in a local storage accessible to the processor, and where the entry stores a location on a local storage device which is physically attached to the processor for a first item of multimedia and a second entry for a second item of multimedia that indicates a service that is accessible over the Internet via the network and stores only a name of an Internet service provider who provides multimedia for a second item of multimedia; and software running on the processor finds content related to each of the content identifiers, the software finds at least one of the content on a remote device by accessing the Internet service provider using the name to access the multimedia, the remote device is accessible to the device through the network, and to play the items in the playlist including the item accessed over the Internet, said processor operating to find content which has not yet been found by first setting a cost variable to a maximum amount a user is willing to spend for the content, searching a first provider for said content, and if the content is available on the first provider, determining if the cost is less than a highest cost, and if the cost is less than the highest cost, determining if the cost is less than a previously-found lowest cost which was found, and if the cost is less than the previously-found lowest cost, then setting the cost from the first provider as a new lowest cost, and continuing to search other providers for said content, and accepting a lowest-cost provider, whose cost is less than the maximum amount the user is willing to spend, and obtaining rights from that lowest-cost provider; and marking the content as unavailable if the content is not found on any multiple content providers; and marking the content as too expensive if the content on all prices for obtaining the content are greater than the maximum cost.

10. The device of claim 9, wherein the service includes a network attached storage device which is accessed via an Internet access location where said Internet access location connects via said network interface, and stores multiple items of content.

11. The device of claim 9, wherein the location of content after the rights have been obtained is only a name of a content provider from which the rights have been obtained and not a complete internet address, where the playlist includes multiple different names representing multiple different content providers.

12. The device of claim 9, wherein the entry also includes an indication that a location of the content has not been yet found, and needs to be found in the future.

13. The device of claim 9, wherein the content identifiers include a title.

14. The device of claim 9, wherein the device further includes software running on the processor that accesses at least one of the content and displays video from the at least one of the content on the display.

15. The device of claim 9, wherein the device further includes software running on the processor that accesses at least one of the content and converts digital audio from the at least one of the content into audible content.

16. The system as in claim 1, wherein said computer operates by initially setting a first cost associated with first content as a current low cost, searching for said first content on each of said multiple different content providers, and if said first content is found on a source, then comparing a cost for said first content on said source with said current low cost, and setting said cost for said first content to be the current low cost if the cost for said content is less than the current low cost, and after searching all of said multiple different content providers, determining if the current low cost is equal to the first cost, and marking the content as unavailable if the current low cost is equal to the first cost.

17. The method as in claim 7, further comprising initially setting a first cost associated with first content as a current low cost, searching for said first content on each of multiple content providers, and if said first content is found on a source, then comparing a cost for said first content on said source with said current low cost, and setting said cost for said first content to be the current low cost if the cost for said content is less than the current low cost, and after searching all of said multiple content providers, determining if the current low cost is equal to the first cost, and marking the content as unavailable if the current low cost is equal to the first cost.

18. The device as in claim 9, wherein said device operates by initially setting a first cost associated with first content as a current low cost, searching for said first content on each of said multiple content providers, and if said first content is found on a source, then comparing a cost for said first content on said source with said current low cost, and setting said cost for said first content to be the current low cost if the cost for said content is less than the current low cost, and after searching all of said multiple content providers, determining if the current low cost is equal to the first cost, and marking the content as unavailable if the current low cost is equal to the first cost.

* * * * *